United States Patent
Komaili et al.

(10) Patent No.: US 7,155,176 B2
(45) Date of Patent: Dec. 26, 2006

(54) SYSTEM FOR SYNCHRONIZING A PORTABLE TRANSCEIVER TO A NETWORK

(75) Inventors: Jaleh Komaili, Irvine, CA (US); Darioush Agahi, Irvine, CA (US); Ricke W. Clark, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 342 days.

(21) Appl. No.: 10/820,252

(22) Filed: Apr. 8, 2004

(65) Prior Publication Data
US 2005/0227630 A1 Oct. 13, 2005

(51) Int. Cl.
*H04B 1/40* (2006.01)

(52) U.S. Cl. .......... 455/76; 455/78; 455/260; 455/318; 455/333; 455/264; 331/158; 331/173; 332/124; 332/136; 375/316; 375/376

(58) Field of Classification Search .......... 455/76, 455/260, 78, 318, 333, 264; 331/158, 173; 332/124, 136; 375/316, 376
See application file for complete search history.

(56) References Cited

U.S. PATENT DOCUMENTS

| | | | | |
|---|---|---|---|---|
| 4,394,776 A | * | 7/1983 | Borras et al. ........... 455/76 |
| 4,631,496 A | * | 12/1986 | Borras et al. ........... 331/1 A |
| 5,809,395 A | * | 9/1998 | Hamilton-Piercy et al. .. 725/706 |
| 6,185,201 B1 | * | 2/2001 | Kiyanagi et al. ........ 370/343 |
| 6,226,508 B1 | * | 5/2001 | Takahashi et al. ....... 455/277.1 |
| 6,226,537 B1 | * | 5/2001 | Namura et al. ......... 455/574 |
| 6,240,149 B1 | * | 5/2001 | Yukitomo et al. ....... 375/347 |
| 6,496,488 B1 | * | 12/2002 | Cooley et al. .......... 370/324 |
| 6,850,735 B1 | * | 2/2005 | Sugar et al. ........... 455/67.11 |
| 6,907,229 B1 | * | 6/2005 | Shpak ................. 455/69 |
| 6,956,440 B1 | * | 10/2005 | Choi ................... 331/1 A |

* cited by examiner

*Primary Examiner*—Marceau Milord (57) ABSTRACT

A system for synchronizing a portable transceiver to a network is disclosed. Embodiments of the system for synchronizing a portable transceiver to a network include a crystal oscillator, a frequency synthesizer adapted to receive an output of the crystal oscillator, logic coupled to the crystal oscillator, the logic configured to estimate a frequency error of a received signal; and a first control signal supplied from the logic to the frequency synthesizer, the first control signal configured to adjust the frequency synthesizer to compensate for the error.

27 Claims, 4 Drawing Sheets

SYSTEM FOR SYNCHRONIZING A PORTABLE TRANSCEIVER TO A NETWORK

BACKGROUND OF THE INVENTION

1. Field of the Invention

This invention relates generally to a synchronization system for a wireless transmitter more particularly, the invention relates to a system for synchronizing a portable transceiver to a network in both frequency and time with limited crystal tuning.

2. Related Art

With the increasing availability of efficient, low cost electronic modules, mobile communication systems are becoming more and more widespread. For example, there are many variations of communication schemes in which various frequencies, transmission schemes, modulation techniques and communication protocols are used to provide two-way voice and data communications in a handheld, telephone-like communication handset, also referred to as a portable transceiver. The different modulation and transmission schemes each have advantages and disadvantages. These portable transceivers each communicate with a communication network via a base-station, located in what is typically referred to as a "communication cell" or "cell."

As mobile communication systems have been developed and deployed, many different standards have evolved, to which these systems must conform. For example, in the United States, many portable communications systems comply with the IS-136 standard, which requires the use of a particular modulation scheme and access format. In the case of IS-136, the modulation scheme is narrow band offset $\pi/4$ differential quadrature phase shift-keying ($\pi/4$-DQPSK), and the access format is TDMA.

In Europe and increasingly in other countries, the global system for mobile communications (GSM) standard requires the use of the gaussian minimum shift-keying (GMSK) modulation scheme in a narrow band TDMA access environment, which uses a constant envelope modulation methodology. Other modulation formats use minimum shift keying (MSK), frequency shift-keying (FSK) and other shift-keying modulation methodologies.

Furthermore, in a typical GSM mobile communication system using narrow band TDMA technology, a GMSK modulation scheme supplies a low noise phase modulated (PM) transmit signal to a non-linear power amplifier directly from an oscillator. In such an arrangement, a highly efficient, non-linear power amplifier can be used thus allowing efficient modulation of the phase-modulated signal and minimizing power consumption. Because the modulated signal is supplied directly from an oscillator, the need for filtering, either before or after the power amplifier, is minimized. Further, the output in a GSM transceiver is a constant envelope (i.e., a non time-varying amplitude) modulation signal.

Regardless of the type of communication methodology used, each portable transceiver must maintain frequency and timing synchronization with the communication network to which it is connected. For example, in GSM, the portable transceiver must maintain a carrier frequency accurate to within 0.1 part per million (ppm) of that of the base station. Also, the portable transceiver must maintain its time base to within 2 microseconds (μs) of the time base of the base station. The time base of the portable transceiver is adjusted in increments of ¼ of a symbol period (0.9225 μs) in intervals of Δt such that 1 s<Δt<2 s until any error is less than ½ of a symbol period. Many portable communication handsets maintain synchronization to the network by using a tunable crystal in a closed tracking loop. For example, some systems use a costly temperature controlled voltage controlled crystal oscillator (TCVCXO), and some use a varactor to adjust a voltage controlled crystal oscillator (VCXO). A varactor controlled oscillator is less accurate than a capacitor controlled oscillator and usually requires a more costly digital-to-analog converter (DAC). A capacitor controlled oscillator is adjusted using a set of capacitor arrays, which effectively form a DAC. In such a system, the crystal is adjusted, typically using a complex array of fixed and adjustable capacitances providing coarse and fine tuning capability using feedback from the network. For example, in the GSM communication network, some portable communication devices use a capacitor controlled crystal oscillator (CCXO) to maintain frequency and timing synchronization with the network. Unfortunately, highly accurate crystals are costly, and complex capacitor arrays for tuning the CCXO consume valuable area on the integrated circuit device on which they are located.

Therefore it would be desirable to reduce the required accuracy of the crystal oscillator and to reduce the complexity of the tuning circuitry used to adjust the crystal oscillator and still maintain frequency and timing synchronization with a communication network.

SUMMARY

Embodiments of the system for synchronizing a portable transceiver to a network include a crystal oscillator, a frequency synthesizer adapted to receive an output of the crystal oscillator, logic coupled to the crystal oscillator, the logic configured to estimate a frequency error of a received signal, and a first control signal supplied from the logic to the frequency synthesizer, the first control signal configured to adjust the frequency synthesizer to compensate for the error. In one embodiment, the logic makes limited adjustments to system frequency and timing without adjusting the crystal oscillator. In an alterative embodiment, a limited capacitor array is adjusted to adjust to the output of the crystal oscillator if a system frequency error would result in more frequent timing adjustments than that allowed by standards. The system can be used to synchronize a portable transceiver to a network in both the frequency and time domain.

Related methods of operation are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Although described with particular reference to a GSM communication network, the system for synchronizing a portable transceiver to a network can be implemented in any system that uses a crystal oscillator for frequency and timing control or any crystal oscillator, such as one that can synchronize to a network to within approximately ±2.5 parts per million (ppm) of its reference frequency.

The system for synchronizing a portable transceiver to a network can be implemented in software, hardware, or a combination of software and hardware. In a preferred embodiment, the system for synchronizing a portable transceiver to a network may be implemented using a combination of hardware and software. The hardware can be implemented using discrete and/or specialized hardware elements and logic. The software portion of the system and method for synchronizing a portable transceiver to a network can be stored in a memory and be executed by a suitable instruction execution system (e.g., microprocessor). The hardware implementation of the system for synchronizing a portable transceiver to a network can include any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc. The hardware can be implemented using, for example, complementary metal oxide semiconductor (CMOS), bi-polar CMOS (BiCMOS) or other processing technologies.

The software of the system for synchronizing a portable transceiver to a network comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
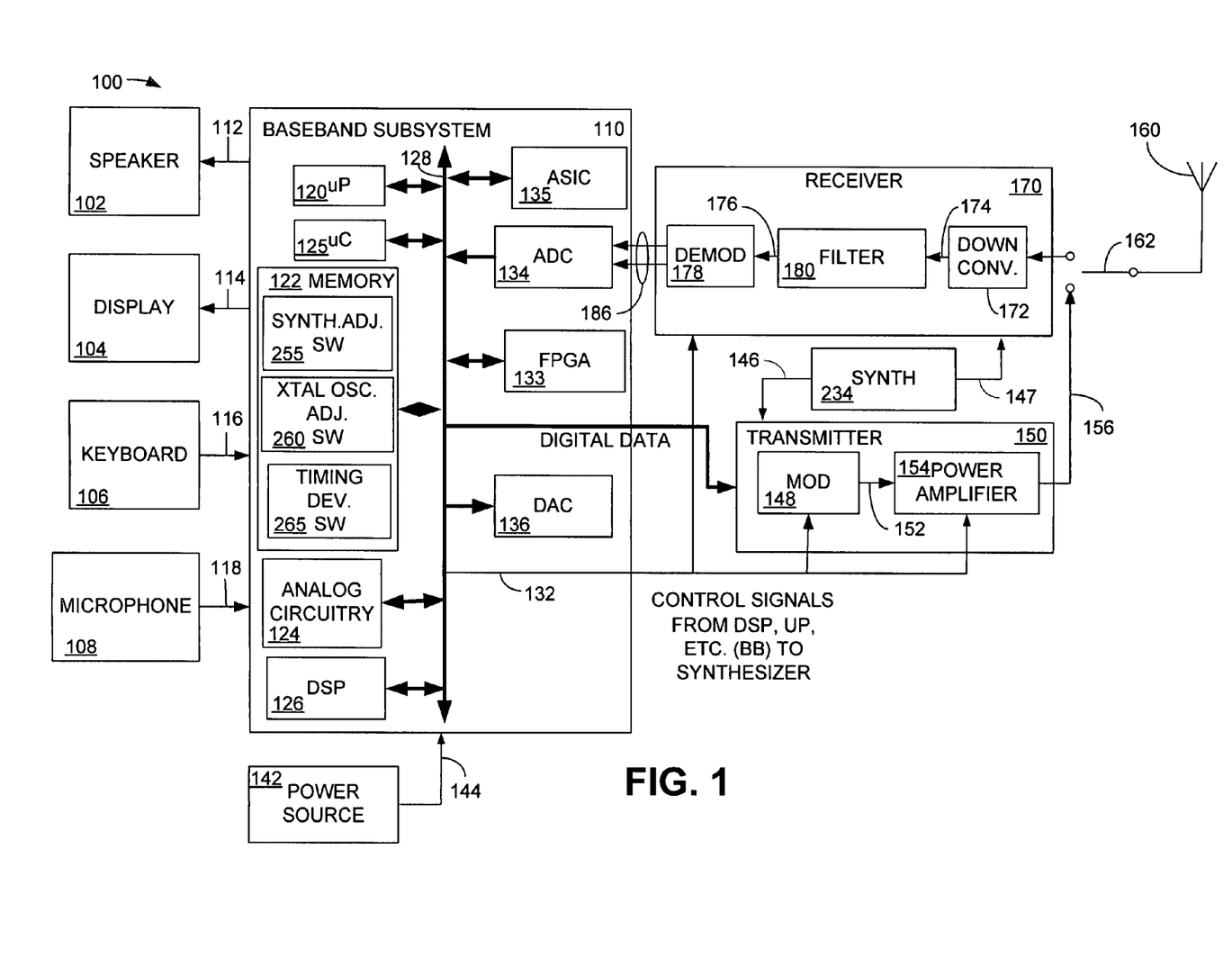
FIG. 1 is a block diagram illustrating a simplified portable transceiver.

FIG. 1 is a block diagram illustrating a simplified portable transceiver 100 including a system for synchronizing a portable transceiver to a network, referred to below as the "synchronization system." The portable transceiver 100 is also sometimes referred to as a "mobile unit" or "mobile." The portable transceiver 100 includes speaker 102, display 104, keyboard 106, and microphone 108, all connected to baseband subsystem 110. A power source 142, which may be a direct current (DC) battery or other power source, is also connected to the baseband subsystem 110 via connection 144 to provide power to the portable transceiver 100. In a particular embodiment, portable transceiver 100 can be, for example but not limited to, a portable telecommunication device such as a mobile cellular-type telephone. Speaker 102 and display 104 receive signals from baseband subsystem 110 via connections 112 and 114, respectively, as known to those skilled in the art. Similarly, keyboard 106 and microphone 108 supply signals to baseband subsystem 110 via connections 116 and 118, respectively. Baseband subsystem 110 includes microprocessor (μP) 120, microcontroller (μC) 125, memory 122, analog circuitry 124, and digital signal processor (DSP) 126 in communication via bus 128. Bus 128, although shown as a single bus, may be implemented using multiple busses connected as necessary among the subsystems within baseband subsystem 110.

Depending on the manner in which the synchronization system is implemented, the baseband subsystem 110 may also include an application specific integrated circuit (ASIC) 135 and a field programmable gate array (FPGA) 133.

Microprocessor 120 and memory 122 provide the signal timing, processing and storage functions for portable transceiver 100. Analog circuitry 124 provides the analog processing functions for the signals within baseband subsystem 110. Baseband subsystem 110 provides control signals to transmitter 150 and receiver 170 via connection 132. Although shown as a single connection 132, the control signals may originate from the DSP 126, the ASIC 135, the FPGA 133, or from microprocessor 120, and are supplied to a variety of connections within the transmitter 150 and the receiver 170. It should be noted that, for simplicity, only the basic components of portable transceiver 100 are illustrated herein. The control signals provided by the baseband subsystem 110 control the various components within the transmitter 150 and the receiver 170. Further, while some portions of the baseband subsystem 110 are implemented using digital logic (ie., the DSP 126, FPGA 133 microprocessor 120, microcontroller 125) and some portions may be implemented using analog logic (i.e., analog circuitry 124), the baseband subsystem 110 may include what is referred to as a "mixed signal device" (MSD). The MSD may include, for example, analog and digital logic elements for performing the various functions described herein.

If portions of the system and method for synchronizing a portable transceiver to a network are implemented in software that is executed by the microprocessor 120, the memory 122 typically will also include the synthesizer adjustment software 255, the coarse crystal oscillator adjustment software 260 and the timing deviation estimation software 265. The synthesizer adjustment software 255, coarse crystal oscillator adjustment software 260 and the timing deviation estimation software 265 may comprise one or more executable code segments that can be stored in the memory 122 and executed in the microprocessor 120. The synthesizer adjustment software 255, coarse crystal oscillator adjustment software 260 and the timing deviation estimation software 265 may also be implemented in a single software module. Alternatively, the functionality of the synthesizer adjustment software 255 and the coarse crystal oscillator adjustment software 260 can be coded into the ASIC 135 or can be executed by the FPGA 133. Because the memory 122 can be rewritable and because the FPGA 133 is reprogrammable, updates to the synthesizer adjustment software 255 and the coarse crystal oscillator adjustment software 260 can be remotely sent to and saved in the portable transceiver 100 when implemented using either of these methodologies.

Baseband subsystem 110 also includes analog-to-digital converter (ADC) 134 and digital-to-analog converter (DAC) 136. ADC 134 and DAC 136 also communicate with microprocessor 120, microcontroller 125, memory 122, analog circuitry 124 and DSP 126 via bus 128.

The transmitter 150 includes modulator 148, which modulates digital baseband information received from the DSP 126 via the bus 128, upconverts the modulated signal to a radio frequency (RF) level and provides a modulated RF signal via connection 152 to the power amplifier 154.

The power amplifier 154 supplies the RF signal via connection 156 to switch 162. The switch 162 controls the passage of transmit signals and receive signals, as known to those having ordinary skill in the art. The transmit signal is supplied from the switch 162 to the antenna 160.

A signal received by antenna 160 will be directed from the switch 162 to the receiver 170. The receiver 170 includes a downconverter 172, a filter 180 and a demodulator 178. The downconverter 172 includes a low-noise amplifier (LNA) (not shown) and circuitry (not shown) to convert the received signal from an RF level to a baseband level (DC), either through an intermediate frequency (IF) or directly to baseband if the receiver is a so called "direct conversion" receiver.

The demodulator 178 recovers the transmitted analog information and supplies a signal representing this information via connection 186 to ADC 134. ADC 134 converts these analog signals to a digital signal at baseband frequency and transfers the signal via bus 128 to DSP 126 for further processing.

A synthesizer 234 supplies a reference frequency to the transmitter 150 via connection 146 and supplies a reference frequency to receiver 170 via connection 147. The reference frequencies supplied by the synthesizer are used to upconvert the transmit signal, tune the receiver to the correct channel, and downconvert the received signal. In one embodiment, the synthesizer 234 is what is referred to as a "fractional-N" synthesizer.

Figure 2:
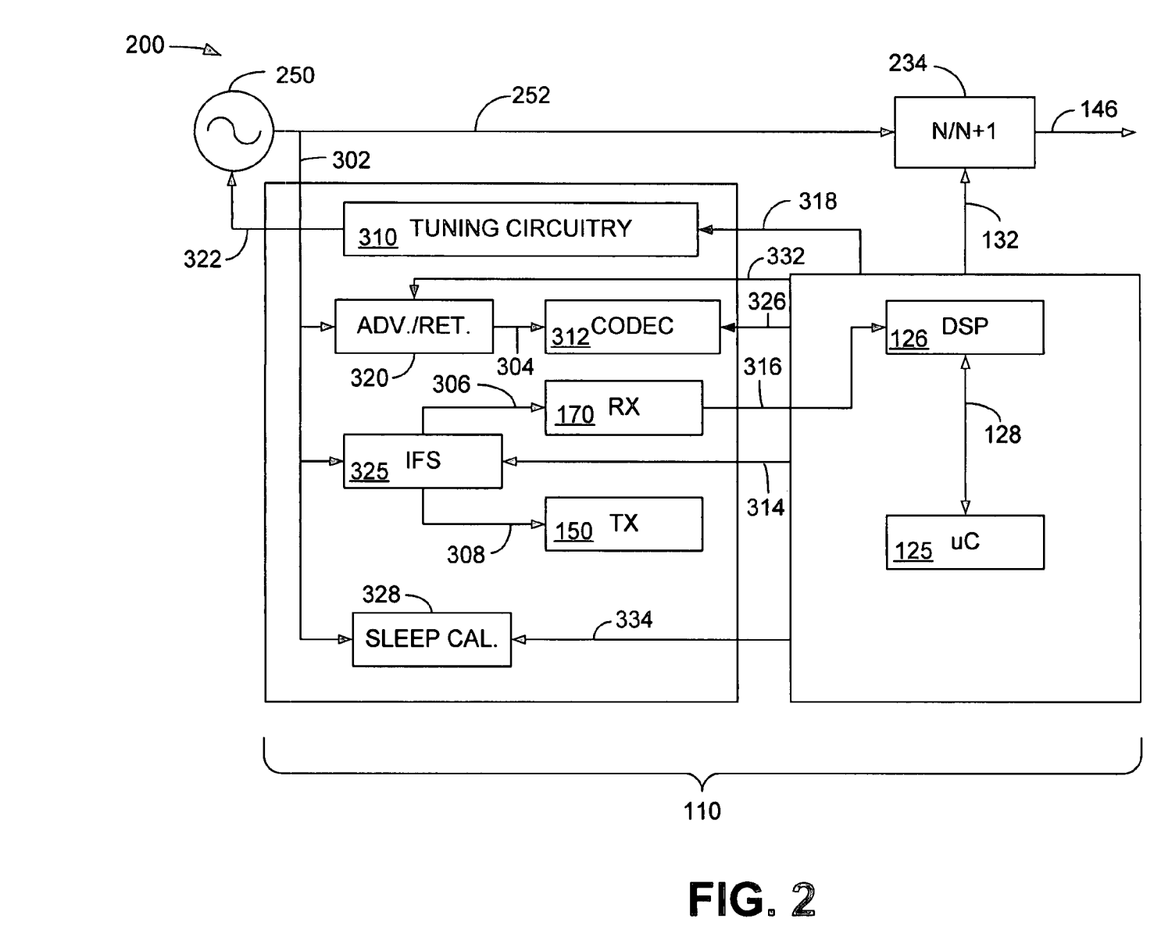
FIG. 2 is a block diagram illustrating an embodiment of the system for synchronizing a portable transceiver to a network.

FIG. 2 is a block diagram 200 illustrating an embodiment of the system for synchronizing a portable transceiver to a network. The synchronization system 200 includes a crystal oscillator 250 that supplies an output via connection 252 to the synthesizer 234. The crystal oscillator 250 may be a "low cost" oscillator having limited tuning capability and reduced accuracy. The synchronization system 200 resides in the baseband subsystem 110, but may also comprise components that are located in what is referred to as a "mixed signal device (MSD)." Generally, a mixed signal device may be a device that operates on the baseband level downconverted receive signal to provide a digitized bitstream containing the information in the receive signal.

The synchronization system 200 includes circuitry for tuning the crystal oscillator. In one embodiment, the circuitry for tuning the crystal oscillator can be a limited capacitor array 310. In an alternative embodiment, the circuitry for tuning the crystal oscillator can be, for example, a digital-to-analog converter (DAC), having a resolution sufficient to tune the crystal oscillator to an accuracy of, for example, ±2.5 ppm. The synchronization system 200 also includes a coder/decoder (CODEC) 312. An advance/retard timing mechanism 320 provides timing control to the codec 312 and an intra-frame sequencer (IFS) 325 provides timing control for the receive 170 and transmit 150 chain. The advance/retard timing mechanism 320 receives a system clock signal from the crystal oscillator 250 via connection 302 and a control signal from the DSP 126 via connection 332. A sleep calibration element 328 receives a system clock signal from the crystal oscillator 250 via connection 302 and a control signal from the DSP 126 via connection 334. In one embodiment, the synthesizer adjustment software 255 is used to fine tune the output of the crystal oscillator 250 by adjusting the synthesizer 234 via a control signal delivered from the baseband (e.g., from the DSP 126 or from the micro controller 125) via connection 132. For example, the synthesizer adjustment software 255 may include logic capable of tuning the crystal oscillator 250 to within ±2.5 ppm. In this manner, the synchronization system 200 can tune to the communication system frequency even though a frequency error exists between the signal received from the communication system with which the portable transceiver is communicating and the crystal oscillator 250. In this embodiment, the baseband subsystem 110 estimates any frequency error between the signal received from the network and the frequency of the portable transceiver and determines whether the frequency error is within the ability of the synthesizer adjustment software 255 and the synthesizer 234 to correct. In this embodiment, the frequency tracking loop is "closed" using the synthesizer rather than directly adjusting the crystal oscillator. For example, instead of adjusting the crystal oscillator 250, the frequency of the synthesizer 234 is adjusted for each time slot in the GSM communication system.

In an alternative embodiment, the tuning circuitry 310 comprises a fixed or an adjustable capacitive network, or a DAC, and is used to tune any frequency or timing errors that are beyond the capability of the adjustment software 255 and the synthesizer 234 to compensate.

In this embodiment, the synchronization system 200 uses the tuning circuitry 310 to coarsely tune the frequency of the crystal oscillator 250 via a control signal on connection 322 to compensate for large frequency drift, caused typically by temperature variation and aging. In this embodiment, the coarse crystal oscillator adjustment software 260 in the baseband subsystem 110 estimates any frequency error in the signal received from the network and determines whether a coarse adjustment signal, which is supplied via connection 318 to the tuning circuitry 310, can compensate for the error. In this embodiment, the tuning circuitry 310 comprises an array of tunable capacitors, which provides a coarse adjustment capability with which to tune the frequency of the crystal oscillator 250.

In another embodiment, the DSP 126 estimates any timing error between the portable transceiver 100 and the network in units of $\frac{1}{8}^{th}$ of a bit, referred to as a "nit." Since the timing of all of the timing and frequency components in the portable transceiver 100 is derived from the crystal oscillator 250, if the crystal oscillator 250 maintains ±2.5 ppm accuracy with respect to the network via the tuning circuitry adjustments, the remaining required timing accuracy can be achieved by the baseband subsystem 110 adjusting the transmit/receive timing, codec timing and sleep calibration timing. Specifically, if the time base of the mobile is different from the time base of the base station by more than 2 μs, the mobile adjusts its time base in increments of ¼ of a symbol period in intervals of $\Delta t$ such that $1 s < \Delta t < 2 s$ until the error is less than ½ bit. This is accomplished by, for example, the DSP 126 or the microcontroller 125 in the baseband subsystem 110 controlling the timing of the advance/retard mechanism 320 via connection 332, the IFS 325 via connection 314 and the sleep calibration element 328 via connection 334. This can be accomplished by, for example, the DSP 126 or the microcontroller 125 writing the corrections to the advance/retard mechanisms of the codec, transmitter 150 and receiver 170. In this manner, the clocks (timing) for the CODEC 312, the transmitter 150 and the receiver 170 are adjusted to maintain timing synchronization with the communication network.

When the crystal oscillator 250 is adjusted for frequency error, the timing chain maintains accurate timing because the sensitivity of the tuning circuitry 310 allows changes to the frequency of the crystal oscillator 250 in steps larger than about 20 hertz (Hz). In this manner, if the frequency drift of the crystal oscillator 250 exceeds, for example, +/−20 Hz, the crystal oscillator 250 is adjusted. A frequency error of 20 Hz in the GSM communication band is equivalent to:

$$\Delta t = \frac{\Delta f}{fc} T_{frame} = \frac{20}{900e+6} 4.615e-3 = 1.025e-10 \text{ s } = \quad \text{Eq.1}$$

$$27.8e-6 \text{ bit\_ti min g} = 3.5 - 6(1/8^{th}GSM \text{ bit})$$

where $\Delta f$ is the frequency error, $f_c$ is the carrier frequency, $T_{frame}$ is the frame timing and $\Delta t$ is the timing error. Based on Eq. 1, if the frequency of the crystal oscillator 250 is corrected, then the time base of the portable transceiver 100 will accurately track the time base of the network.

The timing of the elements in the mixed signal device, RF and baseband is controlled by the IFS 325. The IFS 325 can operate at 8 times the GSM bit rate, or a frequency of 2.166 megahertz (MHz). Therefore, the resolution of the clock within the IFS 325 can be at $\frac{1}{8}^{th}$ of a GSM bit, referred to herein as a "nit" (0.46125 μs). Accordingly, the elements in the mixed signal device 330 can be adjusted with $\frac{1}{8}^{th}$ of a GSM bit precision.

Timing error can be estimated as follows. The portable transceiver 100 includes timing deviation estimation software 265, which estimates any timing deviation from the base station timing within $\frac{1}{8}^{th}$ bit accuracy. The timing deviation estimation software 265 can be used to estimate the timing difference between the portable transceiver 100 and the base station in units referred to as "quarter bit delay," referred to as QBDelay. The microcontroller 125 determines the long-term average of the delay in order to eliminate any detected peak deviations due to multi-path interference. Appropriate adjustments are made to the timing elements of the transmitter 150 and the receiver 170 by the IFS 325. The timing of the CODEC 312 can be advanced or retarded by the timing mechanism 320. During sleep mode, the crystal oscillator 250 is switched off. The system acquires synchronization upon awakening by using calibration data of a sleep oscillator with respect to the crystal oscillator 250 and the error computed upon awakening. In that error calculation, any timing drift is accounted for and compensated. During sleep calibration of the 32 Kilohertz (kHz) sleep clock, the main clock driving the crystal oscillator 250 is used. Therefore, the estimated drift is reflected in the calibration procedure. Frequency error is estimated at every frame. Therefore, frequency error can be used to estimate the timing error derived using Eq. 1 as an alternative.

Timing error can be corrected as follows. Once the timing error is estimated, it is applied to the CODEC 312, receiver 170, transmitter 150, IFS 325 and the sleep calibration element 328. The IFS 325 adjusts the timing of the transmitter 150 and the receiver 170. The timing of the CODEC 312 should remain synchronized with the timing of the transmitter 150 and the receiver 170. This is accomplished by advancing or retarding the timing of the CODEC 312 using the timing mechanism 320. This allows the DSP 126 or the microcontroller 125 to program the CODEC 312 for the number of nits ($\frac{1}{8}^{th}$ of a bit) that it should advance or retard. The polarity of the number determines the direction of the adjustment. For every nit adjusted in the Tx/Rx chain, the CODEC is preferably adjusted by 12 cycles of a 26 MHz clock.

When a limited capacitor array is employed as the tuning circuitry 310 as shown in FIG. 2, the initial error of the crystal oscillator 250 could be largely eliminated during initial factory calibration. Therefore, based on the specification of the crystal oscillator, once the crystal oscillator 250 is calibrated and depending on the crystal, the worst case for initial frequency acquisition is about ±25 ppm due to temperature and aging. For example, in the GSM communication system, the error is approximately +/−22.5 KHz.

For frequency tracking during operation, the DSP 126 determines the extent of the crystal frequency drift. If the required correction is within the resolution of the synthesizer adjustment software 255 for adjusting the frequency of the synthesizer 234, the synthesizer 234 is used to correct the frequency error. If the frequency error is larger than a limit of, for example, ±2.5 ppm, then the tuning circuitry 310 is used for tuning the frequency of the crystal oscillator 250 followed by software adjustments by the synthesizer adjustment software 255, if further correction is warranted.

Regarding time tracking, if only an initial calibration was used to calibrate the crystal oscillator 250, any initial frequency tolerance would be eliminated. However, based on Eq. 1 above, and a ±25 ppm worst case frequency span, a $\Delta t$ of 0.115375e−6 μs=0.25 nit. This results in a measurable timing error every 4 frames. The adjustment required by this timing error is beyond the capability of the coarse crystal oscillator adjustment software 255. However, the analysis can be performed in reverse order to determine the required accuracy of the crystal oscillator 250 to satisfy a communication specification for time synchronization. For example, the GSM specification allows ¼ bit adjustment at least every 216 to 217 frames (1 μs) and that the error should remain under ½ bit. A crystal oscillator 250 with ±1.9 ppm accuracy would drift ½ bit in one second. Since the crystal can be adjusted for ¼ bit error every one second, the ±2.5 ppm accuracy provided by the tuning circuitry 310 will fulfill GSM timing adjustment specification requirements.

According to Eq. 1 above, a ±2 ppm crystal oscillator drift inaccuracy corresponds to +/−4.34 nits per second. As 2 nits correction is allowed during this time, the error is reduced to less than ½ bit. At ±2.5 ppm, the drift rate of the system clock would be about +/−5.34 nits per second. Two nits can be corrected in one second, with total error less than ½ bit. Accordingly, when the tuning circuitry 310 can tune the crystal oscillator 250 to within, for example, ±2.5 ppm accuracy, the need for fine capacitor tuning or an equivalent high-resolution DAC can be eliminated. In this manner, the cost and complexity of the tuning circuitry 310 for the crystal oscillator 250 can be minimized.

Figure 3:
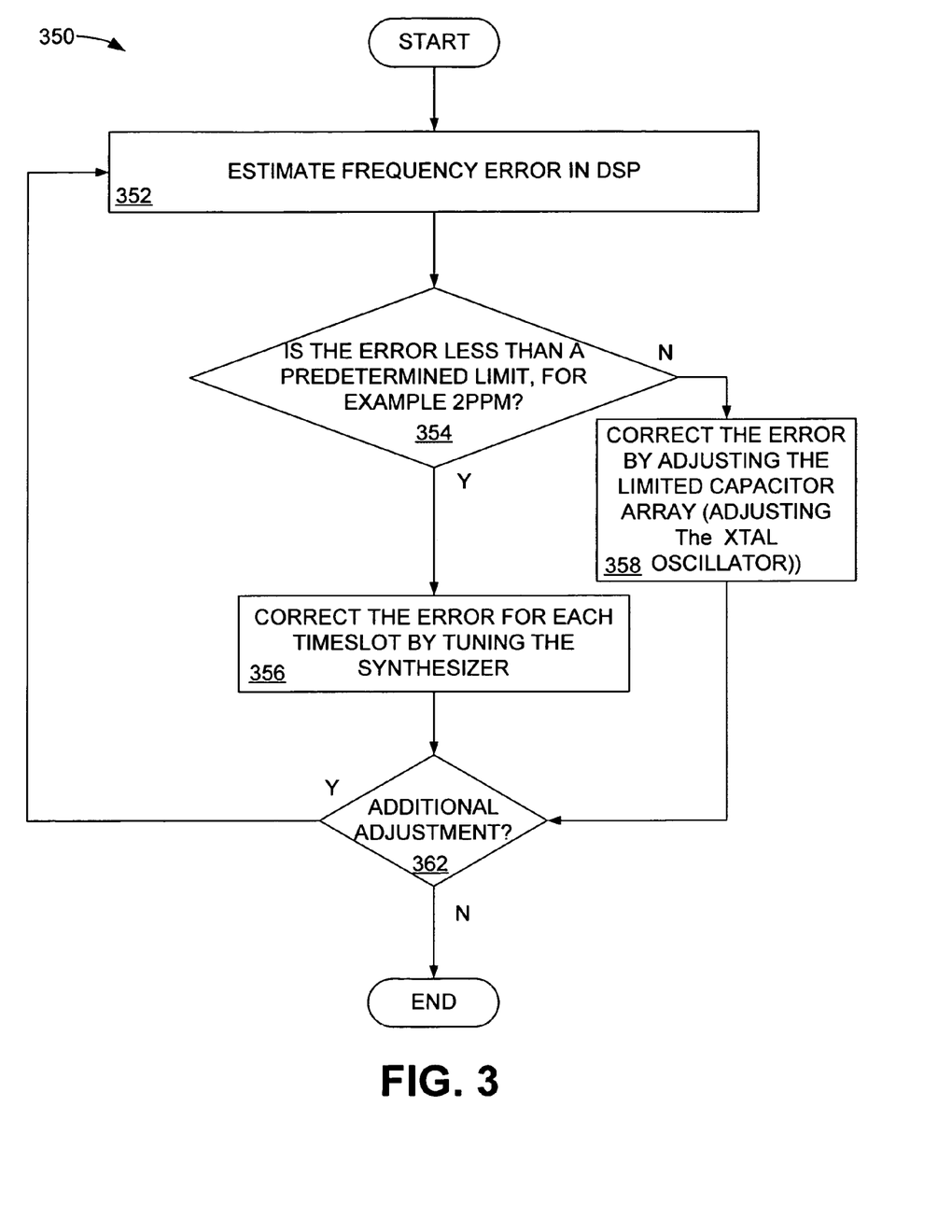
FIG. 3 is a flowchart describing the operation of one embodiment of the synchronization system of FIG. 2.

FIG. 3 is a flowchart 350 describing the operation of one embodiment of the synchronization system 200 of FIG. 2. The flowchart of FIG. 3 and the flowchart of FIG. 4 describe the operation of one embodiment of the invention. Further, the blocks in the flowcharts need not be performed in the order shown. The blocks may be performed in different order or may be performed simultaneously. In block 352, any frequency error output of the crystal oscillator 250 is estimated by the baseband subsystem 110. Preferably, the frequency error can be estimated by the DSP 126. In block 354, it is determined if the error estimated by the DSP 126 in block 352 is within the capability of the synthesizer adjustment software 255 in the baseband subsystem to correct. If the frequency error estimated in block 352 is within the ability of the synthesizer adjustment software 255 in the baseband subsystem to correct, then, in block 356 the baseband subsystem 110 sends the required corrections to the synthesizer 234 and to the timing elements without directly adjusting the crystal oscillator 250.

If, in block 354, it is determined that the amount of error is beyond the ability of the synthesizer adjustment software 255 in the baseband subsystem to correct, then, in block 358, the baseband subsystem 110 adjusts the crystal oscillator 250 directly by adjusting the tuning circuitry 310. After the crystal oscillator 250 is adjusted in this manner to within, for example, ±2.5 ppm, the synthesizer adjustment software 255 finely adjusts the crystal oscillator 250 as described above.

In block 362 it is determined whether additional adjustment is needed. If no additional adjustment is needed, the process ends. If additional adjustment is needed, the process returns to block 352.

Figure 4:
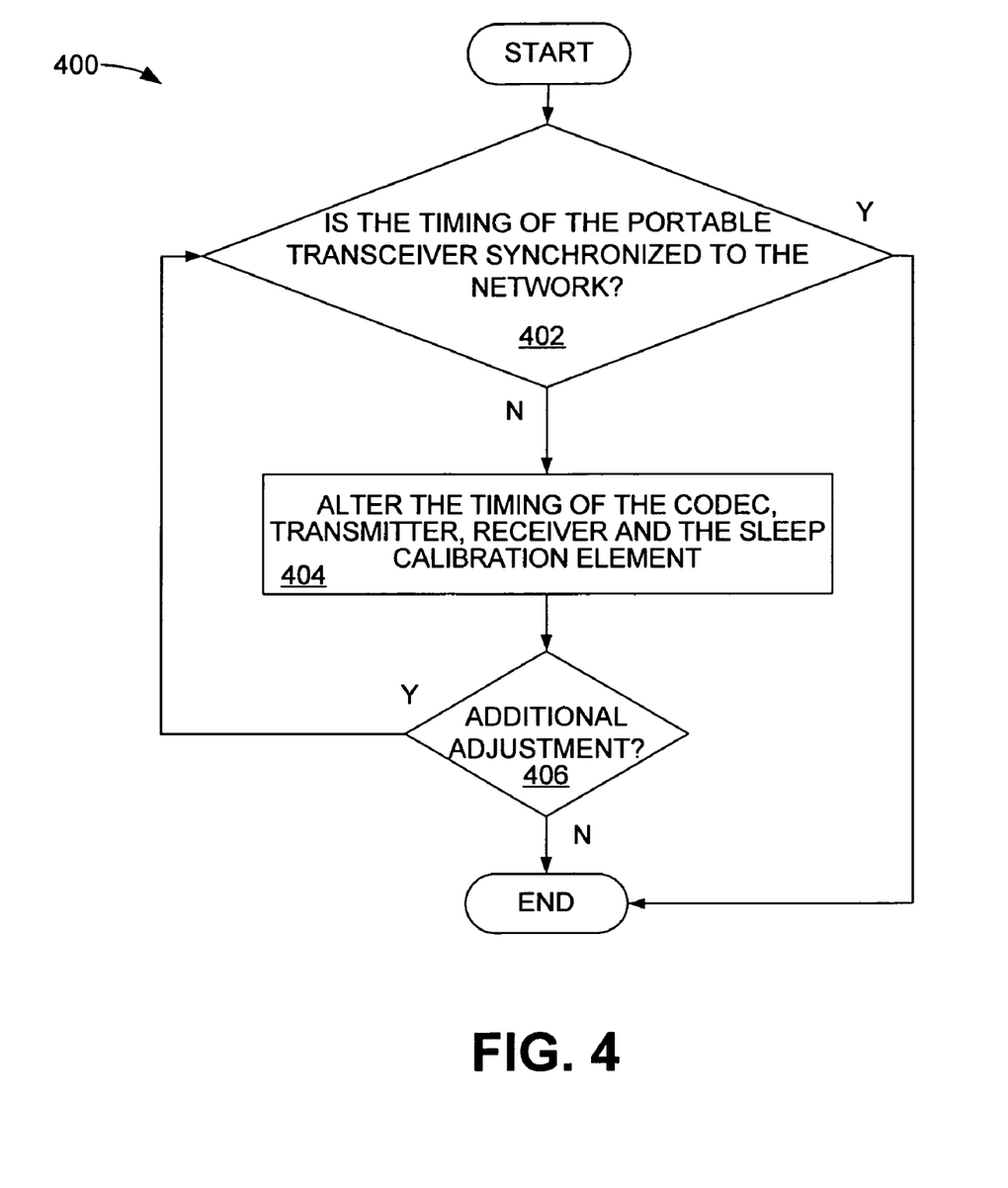
FIG. 4 is a flowchart illustrating an alternative embodiment of the synchronization system of FIG. 2.

FIG. 4 is a flowchart 400 illustrating an alternative embodiment of the synchronization system 200 of FIG. 2. In block 402, the baseband subsystem 110 determines whether the timing of the portable transceiver 100 is synchronized with the network to which it is connected. This can be accomplished using the timing deviation estimation software 265 of FIG. 1. If the timing of the portable transceiver 100 is not synchronized to the network, then, in block 404 the baseband subsystem 110 alters the timing of the CODEC 312, the transmitter 150, the receiver 170 and the sleep calibration element 328 based on the timing error determined in block 402. If the timing of the portable transceiver is synchronized to the network, the process ends. In block 406 it is determined whether additional adjustment is needed. If no additional adjustment is needed, the process ends. If additional adjustment is needed, the process returns to block 402.

While various embodiments of the invention have been described, it will be apparent to those of ordinary skill in the art that many more embodiments and implementations are possible that are within the scope of this invention. For example, a capacitor controlled crystal oscillator (CCXO), a digitally controlled crystal oscillator (DCXO), and a microcontroller controlled crystal oscillator (MCXO), among others, can be used with embodiments of the invention. Accordingly, the invention is not to be restricted except in light of the following claims and their equivalents.

What is claimed is:

1. A system for synchronizing a portable transceiver to a network, comprising:
    a crystal oscillator;
    a frequency synthesizer adapted to receive an output of the crystal oscillator;
    logic coupled to the crystal oscillator, the logic configured to estimate a frequency error of a received signal, the frequency error determined by a comparison of the received signal from the network with the output of the crystal oscillator; and
    a first control signal supplied from the logic to the frequency synthesizer, the first control signal configured to adjust the frequency synthesizer to compensate for the frequency error.

2. The system of claim 1, further comprising:
    tuning circuitry coupled to the crystal oscillator, the tuning circuitry having a limited adjustment capability; and
    a second control signal supplied from the logic to the tuning circuitry, the second control signal configured to adjust the tuning circuitry, the tuning circuitry configured to compensate for the error.

3. The system of claim 2, wherein the adjustment of the frequency synthesizer adjusts the timing of the portable transceiver with respect to a communication network.

4. The system of claim 3, wherein the tuning circuitry comprises a digital-to-analog converter.

5. The system of claim 3, wherein the tuning circuitry comprises a capacitance array.

6. The system of claim 5, wherein the capacitance array comprises fixed capacitance.

7. The system of claim 5, wherein the capacitance array comprises variable capacitance.

8. The system of claim 7, wherein the adjustment capability of the capacitance array can tune the system to between ±2 parts per million (ppm) and ±2.5 ppm with respect to the frequency and timing of the communication network.

9. The system of claim 2, wherein the timing adjustment comprises adjusting the timing of a transmitter, a receiver, a coder/decoder (CODEC) and a sleep calibration element.

10. A method for synchronizing a portable transceiver to a network, comprising:
    determining a frequency error of a signal received by the portable transceiver when compared to a frequency generated within the portable transceiver; and
    if the frequency error is less than a predetermined value, adjusting the frequency of the system by adjusting a frequency synthesizer to compensate for the error.

11. The method of claim 10, further comprising:
    adjusting the frequency of the crystal oscillator by adjusting a tuning circuit associated with the crystal oscillator.

12. The method of claim 11, wherein the adjustment of the frequency synthesizer adjusts the timing of the portable transceiver with respect to a communication network.

13. The method of claim 12, wherein the timing adjustment comprises adjusting the timing of a transmitter, a receiver, a coder/decoder (CODEC) and a sleep calibration element.

14. The method of claim 12, further comprising using a digital-to-analog converter (DAC) to adjust the frequency of the crystal oscillator.

15. The method of claim 12, further comprising using a capacitance array to adjust the frequency of the crystal oscillator.

16. The method of claim 15, further comprising using a fixed capacitance array.

17. The method of claim 15, further comprising using a variable capacitance array.

18. The method of claim 17, wherein the adjustment capability of the variable capacitance array tunes the system frequency to between ±2 parts per million (ppm) and ±2.5 ppm of the frequency of the communication network.

19. A system for synchronizing a portable transceiver to a network, comprising:

means for determining a frequency error of a signal received by the portable transceiver when compared to a frequency generated within the portable transceiver; and means for adjusting the frequency of the system by adjusting a frequency synthesizer to compensate for the frequency error when the frequency error is less than a predetermined value.

20. The system of claim 19, further comprising:

means for adjusting the frequency of the crystal oscillator by adjusting a tuning circuit associated with the crystal oscillator.

21. The system of claim 20, wherein the adjustment of the frequency synthesizer adjusts the timing of the portable transceiver with respect to a communication network.

22. The system of claim 21, wherein the timing adjustment comprises adjusting the timing of a transmitter, a receiver, a coder/decoder (CODEC) and a sleep calibration element.

23. The system of claim 21, wherein the means for adjusting the frequency of the crystal oscillator comprises a digital-to-analog converter (DAC).

24. The system of claim 21, wherein the means for adjusting the frequency of the crystal oscillator comprises a capacitance array.

25. The system of claim 24, wherein the capacitance array comprises a fixed capacitance array.

26. The system of claim 24, wherein the capacitance array comprises a variable capacitance array.

27. The system of claim 26, wherein the adjustment capability of the capacitance array tunes the system frequency to between ±2 parts per million (ppm) and ±2.5 ppm of the frequency of the communication network.

* * * * *